(12) United States Patent
Lian

(10) Patent No.: US 10,970,824 B2
(45) Date of Patent: Apr. 6, 2021

(54) METHOD AND APPARATUS FOR REMOVING TURBID OBJECTS IN AN IMAGE

(71) Applicant: Nokia Technologies Oy, Espoo (NL)

(72) Inventor: Xuhang Lian, Tianjin (CN)

(73) Assignee: Nokia Technologies Oy, Espoo (FI)

(*) Notice: Subject to any disclaimer, the term of this patent is extended or adjusted under 35 U.S.C. 154(b) by 174 days.

(21) Appl. No.: 16/313,407

(22) PCT Filed: Jun. 28, 2017

(86) PCT No.: PCT/FI2017/050483
§ 371 (c)(1),
(2) Date: Dec. 26, 2018

(87) PCT Pub. No.: WO2018/002436
PCT Pub. Date: Jan. 4, 2018

(65) Prior Publication Data
US 2019/0164259 A1    May 30, 2019

(30) Foreign Application Priority Data
Jun. 29, 2016    (CN) .......................... 201610495775.X

(51) Int. Cl.
*G06T 5/00* (2006.01)
*G06K 9/46* (2006.01)
(Continued)

(52) U.S. Cl.
CPC ............ *G06T 5/003* (2013.01); *G06K 9/4642* (2013.01); *G06K 9/628* (2013.01); *G06T 5/009* (2013.01);
(Continued)

(58) Field of Classification Search
None
See application file for complete search history.

(56) References Cited

U.S. PATENT DOCUMENTS

2008/0123960 A1   5/2008   Kim et al.
2010/0322478 A1*  12/2010  Nitanda ................. G06T 5/002
                                                                        382/103
(Continued)

FOREIGN PATENT DOCUMENTS

CN    102231791 A    11/2011
CN    104318535 A     1/2015
(Continued)

OTHER PUBLICATIONS

Q. Zhu, Z. Hu and K. Ivanov, "Quantitative assessment mechanism transcending visual perceptual evaluation for image dehazing," 2015 IEEE International Conference on Robotics and Biomimetics (ROBIO), Zhuhai, 2015, pp. 808-813, doi: 10.1109/ROBIO.2015.7418869 (Year: 2015).*

(Continued)

*Primary Examiner* — Kim Y Vu
*Assistant Examiner* — Nathan J Bloom
(74) *Attorney, Agent, or Firm* — Ditthavong, Steiner & Mlotkowski

(57) ABSTRACT

Embodiments of the present disclosure disclose methods and apparatus for removing turbid objects in an input image. The method comprising: dividing the input image into a first portion having a first transmittance and a second portion having a second transmittance; removing the turbid objects in the first portion using a first approach; removing the turbid objects in the second portion using a second approach; and combining the first portion in which the turbid objects are removed and the second portion in which the turbid objects are removed into an output image, wherein the first approach and the second approach are different and the first transmittance is greater than the second transmittance. The technical effect of the method and apparatus of the embodiments of the present disclosure is that the detail and texture of the
(Continued)

objects in the image are better restored and the color distortion is smaller.

18 Claims, 6 Drawing Sheets

(51) Int. Cl.
*G06T 7/50* (2017.01)
*G06T 7/11* (2017.01)
*G06T 7/90* (2017.01)
*G06K 9/62* (2006.01)
*G06T 5/20* (2006.01)

(52) U.S. Cl.
CPC ............... *G06T 5/20* (2013.01); *G06T 7/11* (2017.01); *G06T 7/50* (2017.01); *G06T 7/90* (2017.01); *G06T 2207/20012* (2013.01); *G06T 2207/20021* (2013.01); *G06T 2207/20081* (2013.01); *G06T 2207/20212* (2013.01)

(56) References Cited

U.S. PATENT DOCUMENTS

| | | | |
|---|---|---|---|
| 2014/0072216 A1* | 3/2014 | Fang | G06T 5/009 382/167 |
| 2016/0328832 A1* | 11/2016 | Jeon | G06T 5/40 |
| 2017/0084005 A1* | 3/2017 | Park | G06T 5/002 |
| 2017/0132771 A1* | 5/2017 | Agaian | H04N 1/6027 |
| 2017/0178297 A1* | 6/2017 | Fattal | G06T 7/11 |

FOREIGN PATENT DOCUMENTS

| | | | |
|---|---|---|---|
| CN | 104331876 A | 2/2015 | |
| CN | 104899844 A | 9/2015 | |
| WO | 2015015051 A1 | 2/2015 | |
| WO | WO-2017014396 A1 * | 1/2017 | ............... G06T 5/00 |

OTHER PUBLICATIONS

Office Action for related Chinese Patent Application No. 201610495775.X, dated Feb. 25, 2020, English Language Summary Included, 11 pages.
Office Action for corresponding European Patent Application No. 17819417.1-1210, dated Feb. 20, 2020, 9 pages.
Guo et al., "Fast defogging and restoration assessment approach to road scene images", published in Journal of Information science and engineering 32, 677-702 (2016), 26 pages.
Ramya et al., "A novel method for the contrast enhancement of fog degraded video sequences.", published in International Journal of Computer Applications (0975-8887), vol. 54—No. 13, Sep. 2012, 5 pages.
Chu et al., "A content-adaptive method for single image dehazing, Pasific-Rim Conference on Multimedia", published in Department of Computer Science and Information Engineering, National Taiwan University, Taipei, Taiwan, 2 pages.
Xu et al., "Review of video and image defogging algorithms and related studies on image restoration and enhancement", published in: IEEE Access ( vol. 4 ), 24 pages.
PCT International Search Report for the related PCT application No. PCT/FI2017/050483, 5 pages.
Office Action for related Chinese Patent Application No. 201610495775.X, dated Sep. 14, 2020, English Language Summary, 5 pages.

* cited by examiner

200

```
┌─────────────────────────────────────────────┐
│ Dividing the input image into a first       │──201
│ portion having a first transmittance and a  │
│ second portion having a second transmittance│
└─────────────────────────────────────────────┘
                    │
                    ▼
┌─────────────────────────────────────────────┐
│ Removing the turbid objects in the first    │──203
│ portion using a first approach              │
└─────────────────────────────────────────────┘
                    │
                    ▼
┌─────────────────────────────────────────────┐
│ Removing the turbid objects in the second   │──205
│ portion using a second approach             │
└─────────────────────────────────────────────┘
                    │
                    ▼
┌─────────────────────────────────────────────┐
│ Combining the first portion in which the    │──207
│ turbid objects are removed and the second   │
│ portion in which the turbid objects are     │
│ removed into an output image, wherein the   │
│ first approach and the second approach are  │
│ different and the first transmittance is    │
│ greater than the second transmittance       │
└─────────────────────────────────────────────┘
```

Fig.2

 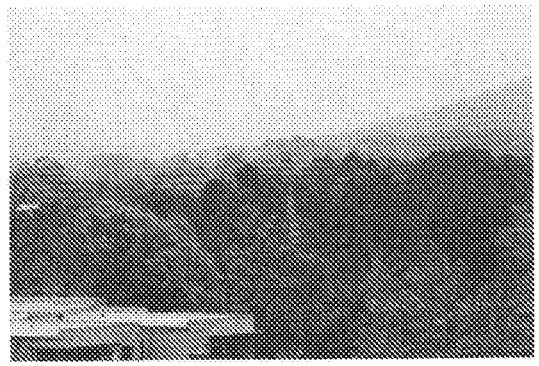
(a) (b)
 
(c) (d)
Fig.8

METHOD AND APPARATUS FOR REMOVING TURBID OBJECTS IN AN IMAGE

CROSS-REFERENCES TO RELATED APPLICATIONS

This application claims priority from PCT Application Serial No. PCT/FI2017/050483, entitled "Method and Apparatus for Removing Turbid Objects in An Image," filed on Jun. 28, 2017, which claims priority from Chinese Patent Application No. 201610495775.X, filed on Jun. 29, 2016, the contents of which are hereby incorporated herein in their entirety by this reference.

FIELD OF THE INVENTION

Embodiments of the present disclosure relate to information technology, and more particularly to methods and apparatus for removing turbid objects in an image.

BACKGROUND

In recent years, with the rapid development of electronic technology and image processing technology, visual systems are widely used in intelligent transportation such as traffic monitoring, driving support system, unmanned system, etc., public safety, border customs, sports events, events detection, tracking, scene analysis and classification, object detection and identification, image indexing and retrieval and many other fields. In some cases, however, there are often a large number of turbid objects in the image, such as fog, smoke, dust, sand storm, haze, etc., which seriously affect the quality of the acquired visual information, thereby greatly affecting the performance of visual system.

As an example, unmanned technology is a key technology of future automotive industry and plays a vital role in improving the traffic environment, reducing the occurrence of traffic accidents and facilitating people's travel in the future. However, an unmanned vehicle sometimes needs to travel in a variety of bad weather in reality environment, such as thick fog, haze and so on. This bad weather seriously affects the quality of the acquired visual information. The visual information of the image is seriously lost especially in a dense fog environment, which greatly affects the performance of the unmanned vehicle for detecting, positioning and identifying surrounding objects. In addition, the dense fog environment seriously hinders the ability of the human eye to judge the scene, resulting in that the driver can not timely and accurately intervene the driving of the unmanned vehicle. In addition, the turbid objects in the image also affect the performance and user experience of other visual systems.

However, the existing methods of removing the turbid objects in the image often cannot better restore the detail and color of the objects in the image, and therefore, an improved technical solution is required.

SUMMARY

In accordance with an aspect of the present disclosure, a method for removing turbid objects in an input image is disclosed. The method comprises: dividing the input image into a first portion having a first transmittance and a second portion having a second transmittance; removing the turbid objects in the first portion using a first approach; removing the turbid objects in the second portion using a second approach; and combining the first portion in which the turbid objects are removed and the second portion in which the turbid objects are removed into an output image, wherein the first approach and the second approach are different and the first transmittance is greater than the second transmittance.

In an embodiment, the transmittance is related to a distance of an object in the input image to an imaging device capturing the input image, dividing the input image into the first portion having the first transmittance and the second portion having the second transmittance comprises dividing the input image into the first portion having the first transmittance and the second portion having the second transmittance based on a depth map of the input image.

In an embodiment, dividing the input image into the first portion having the first transmittance and the second portion having the second transmittance comprises: dividing the input image into a plurality of image blocks; calculating the transmittance of each image block; and dividing the input image into the first portion having the first transmittance and the second portion having the second transmittance based on the transmittance of each image block.

In an embodiment, the method further comprises reclassifying, based on the classification of image blocks surrounding each image block that has been classified, the each image block into the first portion or the second portion.

In an embodiment, calculating the transmittance of each image block comprises calculating the transmittance of each image block based on the following characteristic parameters associated with the transmittance: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

In an embodiment, the transmittance of each image block is linearly represented by the characteristic parameters, each characteristic parameter being associated with respective coefficients, the method further comprises: determining the respective coefficients by learning.

In an embodiment, the first approach is an image restoration approach.

In an embodiment, the image restoration approach comprises obtaining a restored image by the following formula:

$$J = \frac{I - A(1-t)}{t}$$

wherein I is an image block or pixel in the first portion of the input image, J is the image in block or pixel of the first portion of the restored input image, A is the atmospheric light, t is the transmittance of the image block or pixel in the first portion of the input image.

In an embodiment, the second approach is an image enhancement approach.

In an embodiment, the image enhancement approach comprises:

processing the brightness of a pixel in the second portion by the following formula, $$f(x) = \sum_{i=0}^{4} \beta_i x^i$$

where, $f(x)$ is the output brightness of pixel x, x is the input brightness of pixel x, and $β_i$ is a coefficient.

In an embodiment, the method further comprises: adjusting the brightness of the output image so that the brightness of the first portion is consistent with the brightness of the second portion.

In an embodiment, adjusting the brightness of the output image so that the brightness of the first portion is consistent with the brightness of the second portion comprises: dividing the brightness components of the input image into a plurality of image blocks; determining the average brightness of an image block having the largest transmittance in the input image; determining a ratio of the average brightness of each of the other image blocks in the input image to the average brightness of the image block having the largest transmittance; and adjusting, based on the ratio and the brightness of each pixel of the image block in the output image corresponding to the image block having the largest transmittance in the input image, the brightness of the corresponding pixel of the corresponding image block in the output image.

In an embodiment, the method further comprises smoothing the brightness of the pixels at the junction of the first portion and the second portion.

According to another aspect of the present disclosure, there is provided a computer program product embodied on a computer readable medium, the computer program product comprising program instructions that, when loaded into a computer, cause the computer to execute any of the method steps of the above embodiments.

According to another aspect of the present disclosure, there is provided a non-transient computer-readable medium comprising program instructions that cause a processor to perform any of the method steps of the above-described embodiments.

According to another aspect of the present disclosure, there is provided an apparatus comprising at least one processor and at least one memory containing computer program code, the at least one memory and the computer program code being configured to, working with the at least one processor, cause the apparatus to perform any of the method steps of the above embodiments.

According to another aspect of the present disclosure, there is provided an apparatus for removing turbid objects in an input image. The apparatus comprises: a dividing unit configured to divide the input image into a first portion having a first transmittance and a second portion having a second transmittance; a first removing unit configured to remove the turbid objects in the first portion using a first approach; a second removing unit configured to remove the turbid objects in the second portion using a second approach; and a combining unit configured to combine the first portion in which the turbid objects are removed and the second portion in which the turbid objects are removed into an output image, wherein the first approach and the second approach are different and the first transmittance is greater than the second transmittance.

In an embodiment, the transmittance is related to a distance of an object in the input image to an imaging device capturing the input image, and the dividing unit is further configured to divide the input image into the first portion having the first transmittance and the second portion having the second transmittance based on a depth map of the input image.

In an embodiment, the dividing unit is further configured to divide the input image into a plurality of image blocks; calculate the transmittance of each image block; and divide the input image into the first portion having the first transmittance and the second portion having the second transmittance based on the transmittance of each image block.

In an embodiment, the apparatus further comprises: a reclassifying unit configured to reclassify, based on the classification of image blocks surrounding each image block that has been classified, the each image block into the first portion or the second portion.

In an embodiment, the apparatus further comprises: a calculating unit configured to calculate the transmittance of each image block based on the following characteristic parameters associated with the transmittance: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

In an embodiment, the transmittance of each image block is linearly represented by the characteristic parameters, each characteristic parameter being associated with respective coefficients, the apparatus further comprises: a determining unit configured to determine the respective coefficients by learning.

In an embodiment, the first approach is an image restoration approach.

In an embodiment, the image restoration approach comprises obtaining a restored image by the following formula:

$$J = \frac{I - A(1-t)}{t}$$

wherein I is an image block or pixel in the first portion of the input image, J is the image block or pixel of the first portion of the restored input image, A is the atmospheric light, t is the transmittance of the image block or pixel in the first portion of the input image.

In an embodiment, the second approach is an image enhancement approach.

In an embodiment, the image enhancement approach comprises:

processing the brightness of a pixel in the second portion by the following formula, $$f(x) = \sum_{i=0}^{4} \beta_i x^i$$

where, $f(x)$ is the output brightness of pixel x, x is the input brightness of pixel x, and $β_i$ is a coefficient.

In an embodiment, the apparatus further comprises: an adjusting unit configured to adjust the brightness of the output image so that the brightness of the first portion is consistent with the brightness of the second portion.

In an embodiment, the adjusting unit is further configured to divide the brightness components of the input image into a plurality of image blocks; determine the average brightness of an image block having the largest transmittance in the input image; determine a ratio of the average brightness of each of the other image blocks in the input image to the average brightness of the image block having the largest transmittance; and adjust, based on the ratio and the brightness of each pixel of the image block in the output image corresponding to the image block having the largest transmittance in the input image, the brightness of the corresponding pixel of the corresponding image block in the output image.

In an embodiment, the apparatus further comprises a smoothing unit configured to smooth the brightness of the pixels at the junction of the first portion and the second portion.

Some embodiments of the present disclosure may better restore the detail and texture of objects in the image, and the color distortion is small. In addition, some embodiments may also avoid a situation where the brightness of the first portion and the second portion are inconsistent. In addition, some embodiments may also make the transition of the first and second portions more natural.

BRIEF DESCRIPTION OF THE DRAWINGS

FIG. 2 shows a flow diagram of a method according to an embodiment of the present disclosure.

FIG. 8 shows the results of the method for image dehazing according to the embodiments of the present disclosure and other methods for image dehazing.

DETAILED DESCRIPTION

Figure 1:
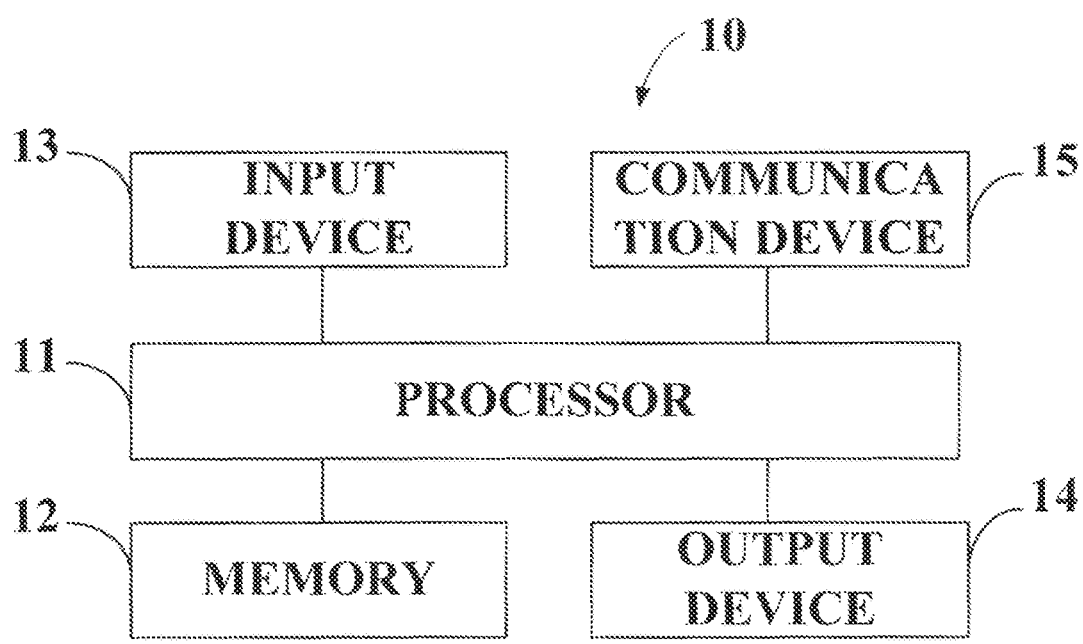
FIG. 1 shows a schematic block diagram of an apparatus that may implement embodiments of the present disclosure.

Embodiments of the present disclosure will be described below with reference to the accompanying drawings. In the following description, numerous specific details are set forth in order to provide a more complete understanding and implementation of the present disclosure by those skilled in the art. It will be apparent to those skilled in the art that the embodiments of the present disclosure may be practiced without some of these specific details. In addition, it is to be understood that the disclosure is not limited to the specific embodiments described. Rather, it is contemplated that embodiments of the present disclosure may be practiced with any combination of features and elements described below. Accordingly, the following aspects, features, examples and advantages are for illustrative purposes only and are not to be regarded as an element or limitation of the claims, unless expressly stated in the claims.

It is to be noted that embodiments of the present disclosure are described in connection with image dehazing in some embodiments of the present disclosure, but the embodiments of the present disclosure are not limited to image dehazing but may be adapted to remove any suitable turbid objects. In addition, while the embodiments of the present disclosure are primarily described in the context of a single image, it is to be understood that the embodiments of the present disclosure are equally applicable to video. It is also to be understood that the embodiments herein may be applied not only to processing non-real-time image or video, but also to processing real-time image or video.

At present, the approaches for image dehazing are mainly divided into two categories. The first approach is based on an image enhancement approach. The main purpose of this approach is to improve the contrast of the image and maintain the clarity of the detail. However, since such an approach does not aim at keeping the fidelity of the color, the color distortion of an object (such as a near object) in the image that is less affected by the fog (also referred to herein as a shallow fog area) is serious. As an example, for a car traveling in a thick fog environment, since a distant object is far from the vehicle and less threatening, a primary goal of the vehicle is to accurately and timely identify the nearby object. However, the image enhancement approach has the characteristics of color distortion such that the accuracy of recognition of a vehicle vision system is reduced for the nearby object, so that the vehicle may not escape obstacles and cause an accident.

Another approach is based on an image restoration approach. The main idea of the approach is based on an imaging model of a fog image, and finally a fogless image is restored by solving the unknown number in the model. In an actual fog environment, since the imaging of an object that is less affected by the fog (for example, the shallow fog area) is more consistent with the imaging model for the fog image, so this approach can better restore the object in the shallow fog area. However for objects (for example, a distant object) that are much affected by fog (also referred to as a dense fog area herein), it may result in that the imaging is not consistent with the model due to severe absorption, reflection and scattering in the path from the distant object to the imaging device. Thus, if the model is still used for the objects that are much affected by fog, it is not possible to better restore the detail of the objects that are much affected by fog, thereby affecting the performance of the visual system, for example, causing the visual system of the unmanned vehicle unable to detect and identify the objects that are much affected by fog.

Therefore, both of the above two approaches cannot simultaneously restore the objects in the shallow fog area and the objects in the dense fog area better. In order to solve or mitigate at least one of the above problems, the present disclosure proposes a technical solution based on image enhancement and image restoration to remove turbid objects in the input image. The technical solution can process the first portion with the first transmittance and the second portion having the second transmittance in the input image with different approaches, so that both the color and detail of the object can be restored better.

As used herein, the transmittance may be related to the degree of light being absorbed, reflected, and scattered by the turbid objects on the path from an object to the imaging device. As an example, it is assumed that the concentration of fog in the air is substantially the same in a foggy weather, since the distance from a distant object to an image forming apparatus is relatively far in an image obtained by the image forming apparatus, the light on the path is much affected by the absorption, reflection and scattering of the fog component so that the transmittance of the path is low, therefore the image quality of the distant object is poor, for example, the loss of detail is large, and the image is blurred, etc. On the contrary, since the distance from a near object to the image forming apparatus is short, the light on the path is less affected by the absorption, reflection and scattering of the fog component so that the transmittance of the path is large, therefore the image quality of the near object is better. In general, if the concentration of the turbid objects is uniform in the imaging environment, it can be considered that the transmittance of the near object in the input image is large and the transmittance of the distant object is small. However, if the concentration of the turbid objects in the imaging environment is not uniform, the transmittance may not be related to the distance of the object. The transmittance of an image block or a pixel refers to the transmittance of the path from the object corresponding to the image block or the pixel to the image forming apparatus throughout this description.

The same reference number refers to the same element throughout this description. As used herein, the terms "data", "content", "information" and the like are used interchangeably to refer to data that can be transmitted, received and/or stored in accordance with embodiments of the present disclosure. Accordingly, the use of any such words should not be construed as limiting the spirit and scope of the embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

FIG. 1 is a block diagram showing an apparatus, such as an electronic apparatus 10, in which various embodiments of the disclosure may be applied. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 10 is illustrated and will be hereinafter described for purposes of example, other types of apparatuses may readily employ embodiments of the disclosure. The electronic apparatus 10 may be a portable digital assistant (PDA), a mobile computer, a desktop computer, a smart TV, a gaming device, a portable computer, a media player, a night vision device, a camera, a video recorder, a mobile phone, a global positioning system (GPS) device, a smartphone, a car navigation system, a video monitoring system, a smartphone, a tablet computer, a laptop computer, a server, a thin client, a cloud computer, a virtual computer, a set-top box, a computing device, a distributed system, and/or any other type of the electronic system. The electronic apparatus 10 may run with any kind of operating system including, but not limited to, Windows, Linux, UNIX, Android, iOS and their variants. Moreover, the electronic apparatus of at least one example embodiment need not to be the entire electronic apparatus, but may be a component or group of components of the electronic apparatus in other example embodiments.

In addition, the electronic apparatus 10 can easily utilize the embodiments of the present disclosure regardless of whether the electronic apparatus is moving or fixed. In this regard, even if embodiments of the present disclosure may be described in connection with mobile applications, it should be understood that embodiments of the present disclosure may be used in connection with various other applications, such as traffic monitoring applications, other than mobile applications.

In at least one example embodiment, the electronic apparatus 10 includes a processor 11 and a memory 12. The processor 11 may be any type of processor, controller, embedded controller, processor core, and/or the like. In at least one example embodiment, the processor 11 uses computer program code to cause the electronic apparatus 10 to perform one or more actions. The memory 12 may include volatile memory, such as volatile random access memory (RAM), which contains a buffer area for temporary storage of data, and/or other memory, such as nonvolatile memory which can be embedded and/or can be mobile. The nonvolatile memory may include an EEPROM, a flash memory, and/or the like. The memory 12 may store any number of pieces of information, as well as data. The information and data may be used by the electronic apparatus 10 to implement one or more functions of the electronic apparatus 10, such as those described herein. In at least one example embodiment, the memory 12 includes computer program code. The memory and computer program code are configured to work with the processor so that the electronic apparatus performs one or more of the actions described herein.

The electronic apparatus 10 may also include a communication device 15. In at least one example embodiment, the communication device 15 includes an antenna (or multiple antennas), a wired connector, and/or the like, which are operatively communicated with the transmitter and/or receiver. In at least one example embodiment, the processor 11 provides a signal to the transmitter and/or receives a signal from the receiver. The signal may include: signaling information based on the communication interface standard, user voice, received data, user generated data, and/or the like. The communication device 15 may operate using one or more air interface standards, communication protocols, modulation types, and access types. By way of illustration, the communication device 15 may operate according to second generation (2G) wireless communication protocol IS-136 (time division multiple access (TDMA)), global mobile communication system (GSM), and IS-95 (code division multiple access (CDMA)), third generation (3G) wireless communication protocols such as Universal Mobile Telecommunications System (UMTS), CDMA 2000, Wideband CDMA (WCDMA) and Time Division Synchronous CDMA (TD-SCDMA), and/or fourth generation (4G) wireless communication protocols, wireless networking protocols such as 802.11, short distance wireless protocols such as Bluetooth, and/or the like. The communication device 15 may operate in accordance with a wired protocol, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the disclosure including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The electronic apparatus 10 may perform control and signal processing functions. The processor 11 may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a motion sensor, a camera, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, touchpen, or other pointing device) and the touch display. A touch input may comprise any input that is detected by a touch display including touch events that involve actual physical contact and touch events that do not involve physical contact but that are otherwise detected by the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format, a moving picture expert group (MPEG) standard format, a Video Coding Experts Group (VCEG) standard format or any other suitable standard formats.

FIG. 2 illustrates a flow diagram of a method 200 for removing turbid objects in an input image according to an embodiment of the present disclosure, which may be performed at an apparatus such as the electronic apparatus 10 of FIG. 1 Thus, the electronic apparatus 10 may provide means for implementing the various parts of the method 200 and means for implementing other functions of the electronic apparatus 10.

The turbid objects in the input image may refer to any turbid objects that affect the image quality, e.g., sharpness. For example, the turbid objects in the input image may be particles in the atmosphere, for example, objects in bad weather such as fog, haze, dust, sandstorm, smoke, and the like. As an example, the images captured by the digital camera often contain a lot of fog components in foggy weather, resulting in a decrease in the contrast of the captured image, the loss of detail of image scene, therefore making the image blurred. In this case, it will greatly affect the performance of the visual system, for example, it cannot accurately identify the object in the image.

The input image may include the image of any color model, for example, a RGB color model, a HSL color model, a CMYK color model, and the like. The format of the image includes but is not limited to: bmp, jpg, jpeg, tiff, gif, pcx, tga, exif, fpx, svg, psd, cdr, pcd, dxf, ufo, eps, ai, raw or other suitable format.

As shown in FIG. 2, method 200 begins at block 201. In block 201, the input image is divided into a first portion having a first transmittance and a second portion having a second transmittance. The input image may be an image stored in advance in a memory of the electronic apparatus 10, an image captured in real time by an image sensor, or an image obtained from a local location or a network location. For example, an image for road condition or the like around an unmanned vehicle can be captured by the image sensor in the unmanned system. The transmittance can be calculated by using any existing or future method that can be used. For example, the information of transmittance associated with the input image may be provided along with the input image in an embodiment.

In another embodiment, the transmittance may be related to the distance from an object in the input image to the imaging device that captures the input image, dividing the input image into a first portion having a first transmittance and a second portion having a second transmittance may include dividing the input image into a first portion having a first transmittance and a second portion having a second transmittance based on a depth map of the input image. For example, in the case where the concentration of the turbid medium (e.g., fog) in the imaging environment is uniform (i.e., homogeneous atmospheric environment), the transmittance may be related to the distance from the object in the input image to the imaging device that captures the input image. In this case, the transmittance can be calculated by the following formula:

$$t(x)=e^{-\beta d(x)} \quad (10)$$

Where x represents a pixel in the input image, t(x) represents the transmittance of the path from the object corresponding to the pixel x to the image forming apparatus that captures the input image (also referred to herein as the transmittance of the pixel), d(x) represents the distance from the object corresponding to the pixel x to the image forming apparatus that captures the input image, β represents a scattering coefficient of the atmosphere and can be considered constant under homogeneous atmospheric conditions. As can be seen from formula (10), the transmittance is mainly related to d(x). d(x) may be obtained by using any suitable existing or future approach for determining depth information (or depth map), for example, the approach for determining the depth information from a plurality of images or a single image. As an example, d(x) can be determined using the following approach: Q. Zhu, J. Mai and L. Shao, "A Fast Single Image Haze Removal Using Color Attenuation Prior," in IEEE Trans. Image Process, vol. 24, no. 11, pp. 3522-3533, 2015, the disclosure of which is incorporated by reference herein in its entirety. In addition, in some cases, some image sensors can acquire the depth map corresponding to the input image at the same time when capturing the image.

After obtaining the transmittance, by defining a threshold $T_s$, the transmittance $t(x) \leq T_s$ can be defined as the second transmittance, and the transmittance $t(x) > T_s$ can be defined as the first transmittance so that the input image can be divided into the first portion having the first transmittance and the second portion having the second transmittance. In some embodiments, different thresholds $T_s$ may be set according to different circumstances, for example, depending on the type of the turbid objects, the concentration of the turbid objects, and the like. In addition, the threshold $T_s$ can also be an empirical value. As an example, the transmittance of the distant scene (e.g., a dense fog area) is less than the transmittance of the near scene (e.g., a shallow fog area) in the foggy weather, therefore the dense fog area can be classified as the second portion, and the shallow fog area can be classified as the first portion.

In addition, it is also possible to divide the input image into non-overlapping image blocks of size m×m in this embodiment, and then select a part of pixels in each image block to calculate its average transmittance as the transmittance of the image block, then the image block is classified into a first portion or a second portion based on the transmittance of the image block. In this way, it can improve the processing speed and meet the applications requiring high real-time. On the contrary, for applications requiring high accuracy and low real-time, the transmittance of each pixel can be calculated, thereby improving the accuracy.

In some cases, it is not possible to acquire the depth map of the input image, or the cost of acquiring the depth map is higher. In view of this, the embodiments of the present disclosure provide another way for segmenting the input image. In this embodiment, dividing the input image into the first portion having the first transmittance and the second portion having the second transmittance comprises: dividing the input image into a plurality of image blocks; calculating the transmittance of each image block; and dividing the input image into the first portion having the first transmittance and the second portion having the second transmittance based on the transmittance of each image block.

In this embodiment, the input image may be first divided into non-overlapping image blocks of size m×m. The transmittance of each image block is then calculated. In an embodiment, calculating the transmittance of each image block comprises extracting three characteristic parameters associated with the transmittance for each image block: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

1) The sum C of the differences between a value of the maximum color channel and a value of the minimum color channel of each pixel of each image block can be calculated by the following formula:

$$C = \sum_{x \in \Omega} \left( \max_c(I_c(x)) - \min_c(I_c(x)) \right) \quad (2)$$

Where Ω represents a image block, x represents a pixel in the image block, c represents a color channel (For example, c represents red, green, and blue color channels in the case of RGB color space), $I_c(x)$ represents a value of channel c of pixel x, $$\max_c(I_c(x))$$

represents the value of the maximum color channel of pixel x, $$\min_c(I_c(x))$$

represents the value of the minimum color channel of pixel x. Larger t(x) represents that the pixel x is less affected by the turbid objects such as fog, therefore the color saturation of the pixel x is larger, the differences between the value $$\max_c(I_c(x))$$

of the maximum color channel and the value $$\max_c(I_c(x))$$

of the minimum color channel is larger, and C is larger. Smaller t(x) represents that the pixel x is much affected by the turbid objects such as fog, therefore the color saturation of the pixel x is smaller, the differences between a value $$\max_c(I_c(x))$$

of the maximum color channel and a value $$\min_c(I_c(x))$$

of the minimum color channel is smaller, and C is smaller.

2) The sum D of the differences between the maximum pixel value of the input image and a value of the minimum color channel of each pixel of the each image block can be calculated by the following formula:

$$D = \sum_{x \in \Omega} \left| I_{max} - \min_c(I_c(x)) \right| \quad (3)$$

Where the definitions of $\Omega$, x, c, $I_c(x)$ and $$\min_c(I_c(x))$$

are same as the corresponding symbols in the formula (2), $I_{max}$ represents the maximum value of the color channels of all the pixels in the input image. Larger t(x) represents that the pixel x is less affected by the turbid objects such as fog, therefore the color saturation of the pixel x is larger, the minimum value of individual color channels of pixel x is smaller, and the value of D is larger; smaller t(x) represents that the pixel x is much affected by the turbid objects such as fog, the pixel value of individual color channels is larger, therefore the difference between $I_{max}$ and the value of the minimum color channel of pixel x is smaller, and the value of D is smaller.

3) The sum G of gradients of each color channel of each pixel of the each image block can be calculated by the following formula:

$$G = \sum_{x \in \Omega} \sum_c |\nabla I_c(x)| \quad (4)$$

The gradients can represent how much texture and detail the image block contains, where the definitions of $\Omega$, x and c are same as the corresponding symbols in formulas (2) and (3), $\nabla I_c(x)$ represents the gradient of pixel x in the color channel c. Larger t(x) represents that the pixel x is less affected by the turbid objects such as fog, therefore the detail and texture of pixel x is more clear, and the sum G of gradients is larger; smaller t(x) represents that the pixel x is much affected by the turbid objects such as fog, therefore the detail is blurred, and the sum G of gradients is smaller.

After extracting the three characteristic parameters associated with the transmittance, any suitable combination of the three characteristic parameters described above can be used to calculate the transmittance of the image block, for example, any suitable polynomial combination, linear combination, etc of the three characteristic parameters described above can be used to calculate the transmittance. By way of example, the combination of the three characteristic parameters and their corresponding coefficients may be determined by way of learning to calculate the transmittance of the image block.

In an embodiment, the transmittance t of each image block is linearly represented by the characteristic parameters described above, and each characteristic parameter is associated with respective coefficients, and the method 200 further comprises determining the respective coefficients by learning. For example, t can be represented by the following formula:

$$t = \alpha_0 C + \alpha_1 D + \alpha_2 G \quad (5)$$

where $\alpha_0$, $\alpha_1$, $\alpha_2$ represents the coefficients which can be obtained by learning, and the coefficients can be varied depending on the situation, for example, the type of the turbid object, the imaging condition, the imaging quality, etc.

In an embodiment, the coefficients $\alpha_0$, $\alpha_1$, $\alpha_2$ may be determined as follows. Selecting N image blocks of size m×m without turbid objects, and taking M values at equal intervals between 0 and 1 for each image block, and using formula (1) to synthesize M corresponding image blocks with turbid objects:

$$I = Jt + A(1-t) \quad (1)$$

Where I represents the image block with turbid objects, J represents the image block without turbid objects, A represents the atmospheric light (it may be set as 255 in general, but it may be set as other value in other embodiments, for example, the brightness value of the element having the highest brightness in the input image), t represents the transmittance for the image block. Formula (1) can be called an imaging model of fog day. In other embodiments, formula (1) may also be replaced by using an imaging model corresponding to other turbid objects. By using formula (1), we can get M×N image blocks with turbid objects. In addition, it should be noted that it is required to use formula (1) for each color channel of the pixel.

The characteristic parameters of the image block with the turbid objects may be computed respectively. Finally, optimal $\alpha_0$, $\alpha_1$, $\alpha_2$ can be computed by minimizing the error, for example, the coefficients $\alpha_0$, $\alpha_1$, $\alpha_2$ can be determined by the formula (6):

$$\alpha = \arg\min_{\alpha_0,\alpha_1,\alpha_2} \sum_{k=1}^{N} \sum_{i=1}^{M} [t_i^k - (\alpha_0 C_i^k + \alpha_1 D_i^k + \alpha_2 G_i^k)]^2 \quad (6)$$

Wherein $\alpha = (\alpha_0, \alpha_1, \alpha_2)$, $t_i^k$ represents the value of the selected i-th transmittance of the k-th image block without turbid objects, $C_i^k$, $D_i^k$, $G_i^k$ represent respectively C, D, and G values of the image block with turbid objects generated by the k-th image block without turbid objects in the case where the i-th transmittance is selected.

After determining the coefficients $\alpha_0$, $\alpha_1$, $\alpha_2$, the transmittance of each image block can be calculated, and the input image can be divided into the first portion having the first transmittance and the second portion having the second transmittance based on the transmittance of each image block.

In addition, the segmented image can be further processed to reduce classification error. In an embodiment, each of the classified image blocks may be reclassified as the first portion or the second portion based on the classification of the image blocks surrounding each image block that has been classified. For example, it is possible to count $M_b \times M_b$ image blocks surrounding each image block, and if there are more than $N_b$ image blocks whose classifications are different from the classification of the center image block, the center image block is classified into the classification opposite to the original classification result. Otherwise it can remain the same. $M_b$ and $N_b$ can be set to different values depending on different situations. In general, $$N_b > \frac{M_b \times M_b}{2}.$$

After dividing the input image into the first portion having the first transmittance and the second portion having the second transmittance, the method may proceed to block 203. At block 203, the first approach is used to remove the turbid objects in the first portion. The first approach may be any suitable existing or future approach suitable for removing the turbid objects in the image having the first transmittance. In an embodiment, the first approach is an image restoration approach.

For example, the image restoration approach may employ the image restoration approach in the following documents: (1) K. He, J. Sun, and X. Tang, "Single Image Haze Removal Using Dark Channel Prior," in Proc. IEEE Conf. Comput. Vis. Pattern Recognit., 2009. (2) Q. Zhu, J. Mai and L. Shao, "A Fast Single Image Haze Removal Using Color Attenuation Prior," in IEEE Trans. Image Process, vol. 24, no. 11, Pp. 3522-3533, 2015. (3) R. Fattal, "Dehazing Using Color-Lines," ACM Trans. Graphics, vol. 34, no. 1, pp. 13: 1-13: 14, 2014. The above documents are incorporated herein by reference in their entirety.

In an embodiment, the image restoration approach includes obtaining a restored image by the following formula:

$$J = \frac{I - A(1-t)}{t} \quad (11)$$

Wherein I is the image block or pixel in the first portion of the input image, J is the image block or pixel of the first portion of the restored input image, and A is the atmospheric light, t is the transmittance of the image block or the pixel of the first portion of the input image.

In addition, it is noted that the formula (11) is required to be used for each color channel of the pixel. In an embodiment, the transmittance of the image block of the first portion of the input image is calculated by using formula (5).

At block 205, the second approach is used to remove the turbid objects in the second portion. The second approach may be any suitable existing or future approach suitable for removing turbid objects in an image having the second transmittance. In addition, the first approach differs from the second approach, and the first transmittance is greater than the second transmittance. In an embodiment, the second approach is an image enhancement approach.

For example, the image enhancement approach may employ the image enhancement approach in the following document: (4) J H. Kim, J Y. Sim and C S. Kim, "Single Image Dehazing Based on Contrast Enhancement," in Proc. IEEE Conf. Acoust. Speech. Signal Process, 2011. (5) R T Tan, "Visibility in bad weather from a single image," in Proc. IEEE Conf. Comput. Vis. Pattern Recognit., 2009. (6) Y. Li, F. Guo, R T Tan and M S Brown, "Single Image Dehazing by Multi-Scale Fusion", in IEEE Trans. Image Process., Vol. 22, no. 8, 2013. The above documents are incorporated herein by reference in their entirety.

Figure 3:
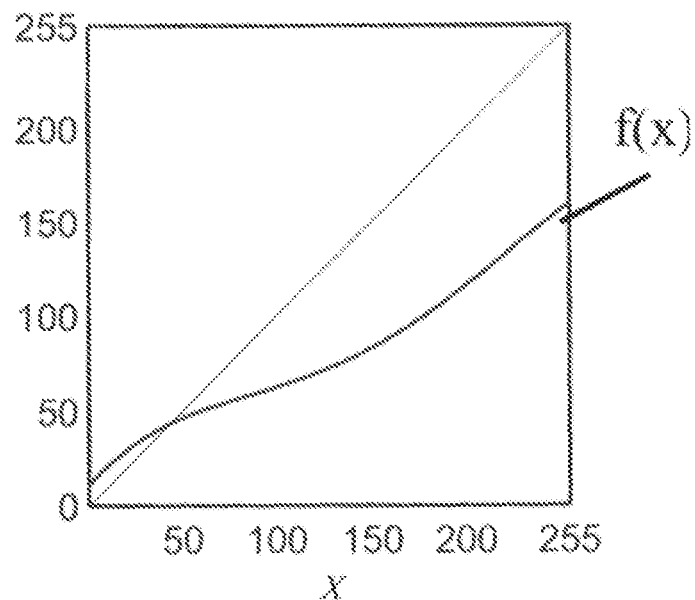
FIG. 3 shows a schematic diagram of a shape of a mapping function according to an embodiment of the present disclosure.

In an embodiment, the image enhancement approach may process the brightness of a pixel in the second portion while maintaining the color component unchanged, thereby maintaining the color without distorting while enhancing the detail. For example, the second portion of the input image may be converted to HSL color space (this step may be omitted if the second portion of the input image is represented by HSL color space). The brightness component (L) is then processed by using the following mapping function $f(x)$, and an approximate shape of the mapping function is schematically shown in FIG. 3:

$$f(x) = \sum_{i=0}^{4} \beta_i x^i \quad (7)$$

Where $f(x)$ is the output brightness of the pixel x, x is the input brightness of the pixel x, $\beta_i$ is a coefficient (e.g., it may be empirically determined or determined by any other suitable means). If the input image is not represented by HSL, the processed second portion may be converted back to the original color space (e.g., RGB space) to obtain an image of enhanced second portion. In addition, it should be noted that the shape of the mapping function in FIG. 3 is only an example.

It is to be noted that blocks 203 and 205 may be executed in any order or in parallel.

The method 200 may then proceed to block 207. At block 207, combining the first portion in which the turbid objects are removed and the second portion in which the turbid objects are removed into an output image.

In addition, in order to avoid the case where the brightness of the first and second portions is inconsistent (e.g., using different approaches to process the first and second portions), the method 200 further comprises adjusting the brightness of the output image so that the brightness of the first portion is consistent with the brightness of the second portion in an embodiment. The method for brightness adjustment may be any suitable existing or future method.

In an embodiment, the process of brightness adjustment may be as follows:

(1) Converting the input image $I_i$ to HSL space (if the input image is represented by HSL, this step can be omitted), and the brightness components thereof are represented by $L_{iHSL}$; the output image obtained according to the above embodiment is converted to HSL space (this step may be omitted if the output image is represented by HSL), hue (H), saturation (S), and brightness (L) components are represented by $H_{dHSL}$, $S_{dHSL}$, $L_{dHSL}$ respectively.

(2) Dividing the brightness components of the input image into a plurality of image blocks. For example, the brightness components $L_{iHSL}$ of the input image are divided into non-overlapping image blocks of size m×m.

(3) Determining the average brightness of an image block having the largest transmittance in the input image. For example, calculating the average brightness of the image block corresponding to the maximum transmittance $P_{tmax}$, which is denoted by $I_i^p$. Herein, the image block with size m×m in the step (2) may be same as the image block with size m×m divided from the input image in the above-described embodiment. In this way, the calculation time of step (3) can be saved. For example, the transmittance of each image block calculated in the above embodiment can be directly used to determine the image block corresponding to the maximum transmittance $P_{tmax}$, and the average brightness of the image block corresponding to the maximum transmittance $P_{tmax}$ may be directly calculated in step (3).

(4) Determining a ratio of the average brightness of each of the other image blocks in the input image to the average brightness of the image block having the largest transmittance. For example, calculating the ratio of the average brightness value $\bar{I}_i^k$ of each of the other image blocks to $\bar{I}_i^p$, that is: $\alpha_i^{kp} = \bar{I}_i^k / \bar{I}_i^p$:

(5) Adjusting, based on the ratio and the brightness of each pixel of the image block in the output image corresponding to the image block having the largest transmittance in the input image, the brightness of the corresponding pixel of the corresponding image block in the output image. For example, the brightness value of each pixel of the k-th image block of the output image can be reassigned by the following formula:

$$L_{dHSL}^k(x,y) = L_{dHSL}^p(x,y) \times \alpha_i^{kp} \qquad (8)$$

Wherein $L_{dHSL}^p(x,y)$ represents the brightness value of the pixel with coordinates (x,y) in the image block in the output image corresponding to the image block having the largest transmittance block in the input image, $L_{dHSL}^k(x,y)$ represents the brightness value of the corresponding pixel (i.e., the pixel with coordinates (x,y)) of the corresponding image block (i.e., the k-th image block) in the output image. Each pixel of each image block of the output image is subjected to the above operation until completing assignment of the brightness values of all of the pixels of all the image blocks.

In addition, the output image by brightness-adjustment may be converted back to the original in color space, for example, RGB space.

Figure 4:
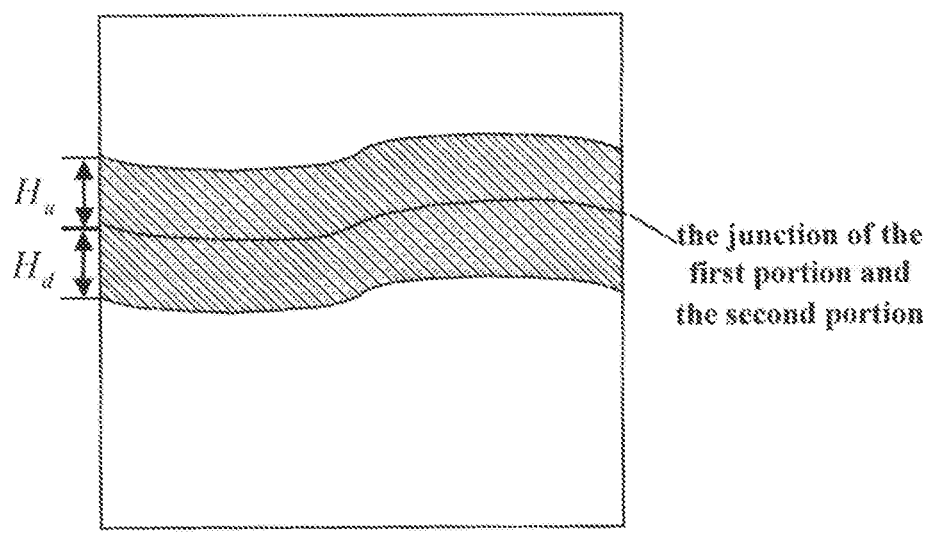
FIG. 4 shows a schematic diagram of an area at the junction of the first and second portions according to an embodiment of the present disclosure.

In an embodiment, the brightness of the pixels at the junction of the first portion and the second portion may be smoothed, for example, such that the brightness at the junction of the first portion and the second portion is more natural. By way of example, the brightness values of $H_u$ pixels above and $H_d$ pixels down the junction can be smoothed, and a schematic diagram at the junction of the first and second portions is shown in FIG. 4. For example, the bilateral filtering method may be used to smooth the pixels near the junction. In an embodiment, the following bilateral filtering formula may be used:

$$L'(y) = \frac{\sum_{y \in \Omega(x)} f(\|y-x\|, \sigma_h) f(\|L(y)-L(x)\|, \sigma_i) L(y)}{\sum_{y \in \Omega(x)} f(\|y-x\|, \sigma_h) f(\|L(y)-L(x)\|, \sigma_i)} \qquad (9)$$

where $f$ is a Gaussian function, $\sigma_h$, $\sigma_i$ are parameters, x is a central pixel, Y is a pixel within the neighborhood of x. After smoothing, it can get the brightness $L_{df}'$. Then, the brightness $L_{df}'$ together with $H_{dHSL}$, $S_{dHSL}$ can be converted to the original color space, e.g., RGB color space. Moreover, in addition to bilateral filtering, any filtering method with smooth function may be used, such as directional filtering.

Figure 5:
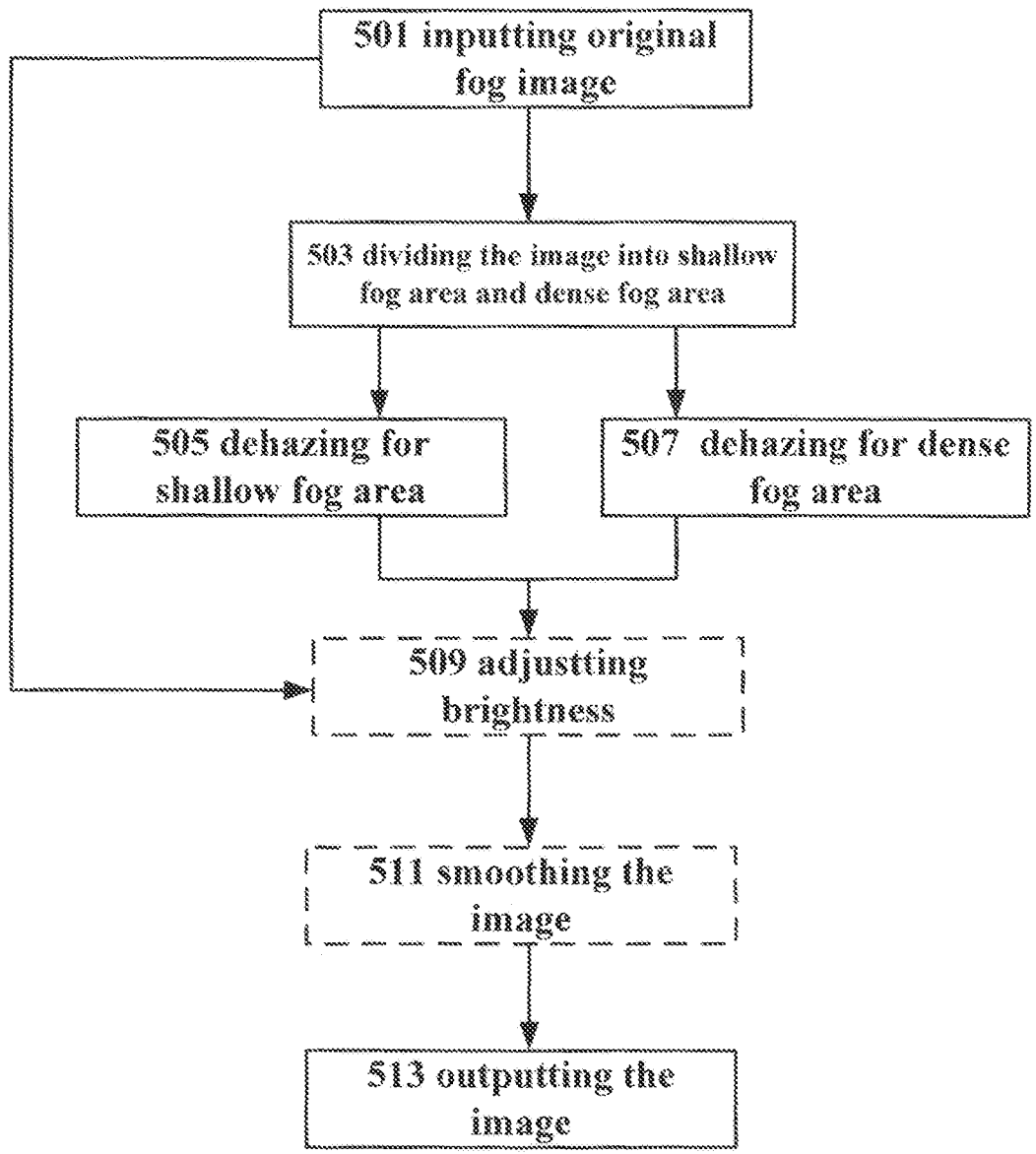
FIG. 5 shows a flow chart of a process of image dehazing according to an embodiment of the present disclosure.

FIG. 5 shows a flow chart of a process of image dehazing according to an example embodiment. The description of the part or function that has been described in the above embodiments is omitted here for brevity.

At 501, an original fog image is input.

At 503, the input fog image is divided into a first portion (e.g., a shallow fog area) having a first transmittance and a second portion (e.g., a dense fog area) having a second transmittance. For example, the transmittance may be determined according to the formula (10) or the formula (5), and the image may be divided into the first portion and the second portion in accordance with the transmittance.

At 505, the image restoration approach is used to remove the fog components from the first portion. For example, the above references (1), (2), (3) or the approaches of the embodiments of the present disclosure may be used at 505. In addition, at block 505, it is also possible to determine an image block having a maximum transmittance according to formula (5) for example.

At 507, the fog components in the second portion are removed using the image enhancement approach. For example, the above references (4), (5), (6) or the approaches of the embodiments of the present disclosure may be used at 507.

At 509 (optional), the brightness of the output image is adjusted so that the brightness of the first portion is consistent with the brightness of the second portion.

At 511 (optional), the brightness of the pixels at the junction of the first and second portions is smoothed.

At 513, an image is output.

Based on the same inventive concept as the method described above, the present disclosure also provides an apparatus for removing turbid objects in an input image. The apparatus may include means for performing the steps of the method described above. The description of same parts as those of the foregoing embodiment is appropriately omitted.

Figure 6:
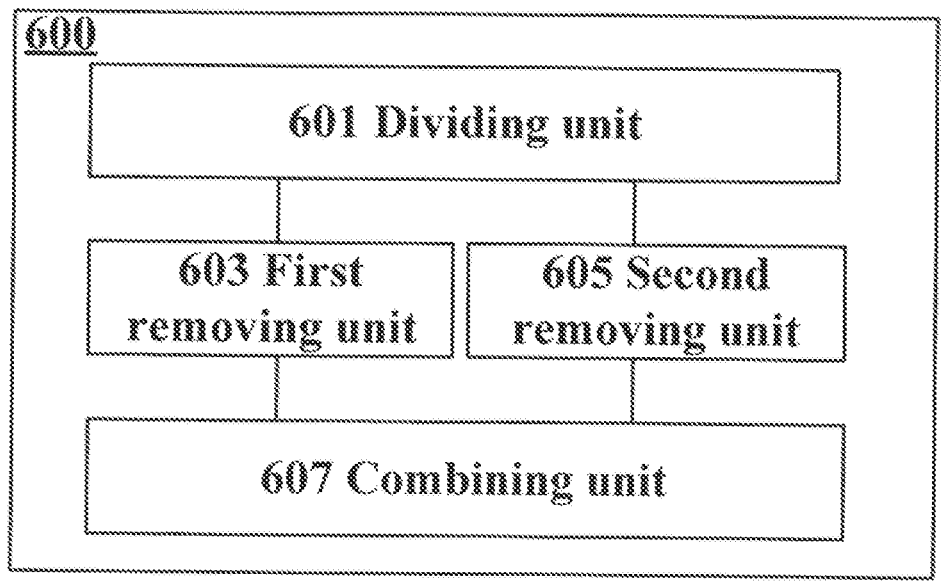
FIG. 6 shows a schematic diagram of an apparatus according to an embodiment of the present disclosure.

FIG. 6 shows an apparatus according to an embodiment of the present disclosure. with reference to FIG. 6, the apparatus 600 comprises a dividing unit 601 configured to divide an input image into a first portion having a first transmittance and a second portion having a second transmittance; a first removing unit 603 configured to remove the turbid objects in the first portion using a first approach; a second removing unit 605 configured to remove the turbid objects in the second portion using a second approach; and a combining unit 607 configured to combine the first portion in which the turbid objects are removed and the second portion in which the turbid objects are removed into an output image, wherein the first approach and the second approach are different and the first transmittance is greater than the second transmittance.

In an embodiment, the transmittance is related to a distance of an object in the input image to an imaging device capturing the input image, and the dividing unit 601 is further configured to divide the input image into the first portion having the first transmittance and the second portion having the second transmittance based on a depth map of the input image.

In an embodiment, the dividing unit 601 is further configured to divide the input image into a plurality of image blocks; calculate the transmittance of each image block; and divide the input image into the first portion having the first transmittance and the second portion having the second transmittance based on the transmittance of each image block.

In an embodiment, the apparatus 600 further comprises: a reclassifying unit (not shown) configured to reclassify, based on the classification of image blocks surrounding each image block that has been classified, the each image block into the first portion or the second portion.

In an embodiment, the apparatus 600 further comprises: a calculating unit (not shown) configured to calculate the transmittance of each image block based on the following characteristic parameters associated with the transmittance: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

In an embodiment, the transmittance of each image block is linearly represented by the characteristic parameters, each characteristic parameter being associated with respective coefficients, the apparatus 600 further comprises: a determining unit (not shown) configured to determine the respective coefficients by learning.

In an embodiment, the first approach is an image restoration approach.

In an embodiment, the image restoration approach comprises obtaining a restored image by the following formula:

$$J = \frac{I - A(1-t)}{t}$$

wherein I is an image block or pixel in the first portion of the input image, J is the image block or pixel of the first portion of the restored input image, A is the atmospheric light, t is the transmittance of the image block or pixel in the first portion of the input image.

In an embodiment, the second approach is an image enhancement approach.

In an embodiment, the image enhancement approach comprises:

processing the brightness of a pixel in the second portion by the following formula, $$f(x) = \sum_{i=1}^{4} \beta_i x^i$$

where, $f(x)$ is the output brightness of pixel x, x is the input brightness of pixel x, and $\beta_i$ is a coefficient.

In an embodiment, the apparatus 600 further comprises: an adjusting unit (not shown) configured to adjust the brightness of the output image so that the brightness of the first portion is consistent with the brightness of the second portion.

In an embodiment, the adjusting unit is further configured to divide the brightness components of the input image into a plurality of image blocks; determine the average brightness of an image block having the largest transmittance in the input image; determine a ratio of the average brightness of each of the other image blocks in the input image to the average brightness of the image block having the largest transmittance; and adjust, based on the ratio and the brightness of each pixel of the image block in the output image corresponding to the image block having the largest transmittance in the input image, the brightness of the corresponding pixel of the corresponding image block in the output image.

In an embodiment, the apparatus 600 further comprises a smoothing unit (not shown) configured to smooth the brightness of the pixels at the junction of the first portion and the second portion.

Figure 7:
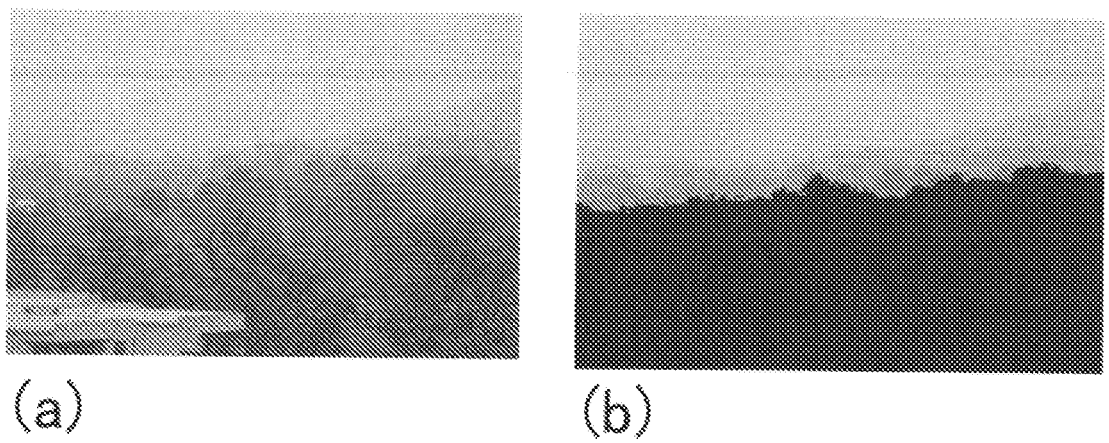
FIG. 7 shows a schematic representation of image segmentation according to an embodiment of the present disclosure.

FIG. 7 shows a schematic representation of the segmentation of a fog image according to an embodiment of the present disclosure. FIG. 7(*a*) shows an original fog image, and FIG. 7(*b*) shows a schematic view of the segmentation result of the input image according to an embodiment of the present disclosure. It can be seen from FIG. 7(*a*) that the near objects (a shallow fog area) are less affected by fog, the color and detail of the image are better, while the distant objects (e.g., a dense fog area) are much affected by fog, and the loss of color and detail of the image is larger. It can be seen from FIG. 7(*b*) that the shallow fog area and the dense fog area are preferably separated by the method of the embodiments of the present disclosure.

FIG. 8 shows the results of the method for image dehazing according to the embodiments of the present disclosure and other methods for image dehazing. FIG. 8(*a*) shows the original fog image, FIG. 8(*b*) shows the results of image dehazing based on the restoration approach, FIG. 8(*c*) shows the results of image dehazing based on the enhancement approach, and FIG. 8(*d*) shows the results of image dehazing based on an embodiment of the present disclosure. It can be seen that the effect of image dehazing based on the restoration approach is very limited as can be seen from the dense fog area in the upper half of FIG. 8(*b*). Looking at the roof area of the lower left corner of FIG. 8(*c*), it can be seen that the color distortion is very large based on the enhancement approach, for example, the original gray roof becomes red and white. As can be seen from FIG. 8(*d*), the method according to the embodiment of the present disclosure not only can satisfactorily remove fog in the dense fog area but also keep the color of the roof in the shallow fog area well. Thus, the effect of image dehazing according to the embodiments of the present disclosure is better than that based on the restoration approach and the enhancement approach. This means that the method according to the embodiment of the present disclosure can not only restore the detail and texture of the object in the image, but also have smaller color distortion.

It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit.

Accordingly, computer software including instructions or code for performing the methodologies of the disclosure, as described herein, may be stored in associated memory devices and, when ready to be utilized, loaded in part or in whole (for example, into RAM) and implemented by a CPU.

Such software could include, but is not limited to, firmware, resident software, microcode, and the like. The computer software may be computer software written in any programming language and may be in the form of source code, object code, or intermediate code between the source code and the object code, such as in partially compiled form, or in any other desirable form.

Embodiments of the present disclosure may take the form of a computer program product contained in a computer-readable medium having computer-readable program code contained thereon. In addition, any combination of computer-readable media may be used. The computer-readable medium may be a computer-readable signal medium or a computer-readable storage medium. The computer-readable storage medium may be, but is not limited to, electrical, magnetic, electromagnetic, optical, or other storage media, and may be a removable medium or a medium that is fixedly installed in the apparatus and device. Non-limiting examples of such computer-readable media are RAM, ROM, hard disk, optical disk, optical fiber, and the like. The computer-readable medium may be, for example, a tangible medium, such as, a tangible storage medium.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

It should also be noted that, in some alternative implementations, the illustrated functions/actions may not occur in the order illustrated in the drawings. If desired, the different functions described in this disclosure may be performed in a different order and/or concurrently with each other. In addition, one or more of the functions described above may be non-essential or may be combined, if desired.

While the embodiments of the present disclosure have been described above with reference to the accompanying drawings, it will be understood by those skilled in the art that the foregoing description is by way of example only and is not intended to be limiting of the present disclosure. Various modifications and variations of the embodiments of the present disclosure may be made therein without departing from the spirit and scope of the disclosure, the scope of which is to be determined only by the appended claims.

The invention claimed is:

1. A method comprising:
dividing an input image into a plurality of image blocks;
calculating a transmittance of one or more of the image blocks;
dividing the input image into a first portion having a first transmittance and a second portion having a second transmittance based on the calculated transmittance of the one or more of the image blocks;
removing turbid objects in the first portion using a first approach;
removing turbid objects in the second portion using a second approach; and
combining the first portion in which the turbid objects are removed and the second portion in which the turbid objects are removed into an output image,
wherein the first approach and the second approach are different and the first transmittance is greater than the second transmittance.

2. The method according to claim 1, wherein the dividing of the input image into the first portion having the first transmittance and the second portion having the second transmittance is based on a depth map of the input image.

3. The method according to claim 1, further comprising:
reclassifying, based on classification of the image blocks surrounding each image block that has been classified, each image block into the first portion or the second portion.

4. The method according to claim 1, wherein the calculating of the transmittance of each image block, further comprising:
calculating the transmittance of each image block based on the following characteristic parameters associated with the transmittance: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

5. The method according to claim 4, wherein the transmittance of each image block is linearly represented by the characteristic parameters, each characteristic parameter being associated with respective coefficients, the method further comprising: determining the respective coefficients by learning.

6. The method according to claim 1 wherein the first approach is an image restoration approach.

7. The method according to claim 1, wherein the second approach is an image enhancement approach.

8. The method according to claim 1, further comprising:
adjusting brightness of the output image so that brightness of the first portion is consistent with brightness of the second portion.

9. The method according to claim 8, wherein the adjusting of the brightness of the output image so that the brightness of the first portion is consistent with the brightness of the second portion, further comprising:
dividing brightness components of the input image into a plurality of image blocks;
determining average brightness of an image block having the largest transmittance in the input image;
determining a ratio of the average brightness of each of the other image blocks in the input image to the average brightness of the image block having the largest transmittance; and
adjusting, based on ratio and brightness of each pixel of the image block in the output image corresponding to the image block having the largest transmittance in the input image, the brightness of the corresponding pixel of the corresponding image block in the output image.

10. An apparatus comprising at least one processor; at least one memory containing computer program code, the at least one memory and the computer program code are configured to, with the at least one processor, cause the apparatus to at least perform:
divide an input image into a plurality of image blocks;
calculate a transmittance of one or more of the image blocks;
divide the input image into a first portion having a first transmittance and a second portion having a second transmittance based on the calculated transmittance of the one or more of the image blocks;

remove turbid objects in the first portion using a first approach;

remove turbid objects in the second portion using a second approach; and combine the first portion in which the turbid objects are removed and the second portion in which the turbid objects are removed into an output image, wherein the first approach and the second approach are different and the first transmittance is greater than the second transmittance.

11. The apparatus according to claim 10, wherein the divide of the input image into the first portion having the first transmittance and the second portion having the second transmittance is based on a depth map of the input image.

12. The apparatus according to claim 10, further comprising the apparatus configured to cause at least to:

reclassify, based on classification of the image blocks surrounding each image block that has been classified, each image block into the first portion or the second portion.

13. The apparatus according to claim 10, further comprising the apparatus configured to cause at least to:

calculate the transmittance of each image block based on the following characteristic parameters associated with the transmittance: a sum of the differences between a value of the maximum color channel and a value of the minimum color channel of each pixel of each image block, a sum of the differences between the maximum pixel value of the input image and a value of the minimum color channel of each pixel of the each image block, and a sum of gradients of each color channel of each pixel of the each image block.

14. The apparatus according to claim 13, wherein the transmittance of each image block is linearly represented by the characteristic parameters, each characteristic parameter being associated with respective coefficients, the apparatus further comprising: determine the respective coefficients by learning.

15. The apparatus according to claim 10, wherein the first approach is an image restoration approach.

16. The apparatus according to claim 10, wherein the second approach is an image enhancement approach.

17. The apparatus according to claim 10, further comprising the apparatus configured to cause at least to:

adjust the brightness of the output image so that the brightness of the first portion is consistent with the brightness of the second portion.

18. The apparatus according to claim 17, wherein the adjusting of the brightness of the output image so that the brightness of the first portion is consistent with the brightness of the second portion, the apparatus is further caused at least to:

divide brightness components of the input image into a plurality of image blocks;

determine average brightness of an image block having the largest transmittance in the input image;

determine a ratio of the average brightness of each of the other image blocks in the input image to the average brightness of the image block having the largest transmittance; and adjust, based on ratio and brightness of each pixel of the image block in the output image corresponding to the image block having the largest transmittance in the input image, the brightness of the corresponding pixel of the corresponding image block in the output image.

* * * * *